Feb. 2, 1937.  E. WILDHABER  2,069,433
GEAR DRIVE
Original Filed Oct. 5, 1933  3 Sheets-Sheet 1
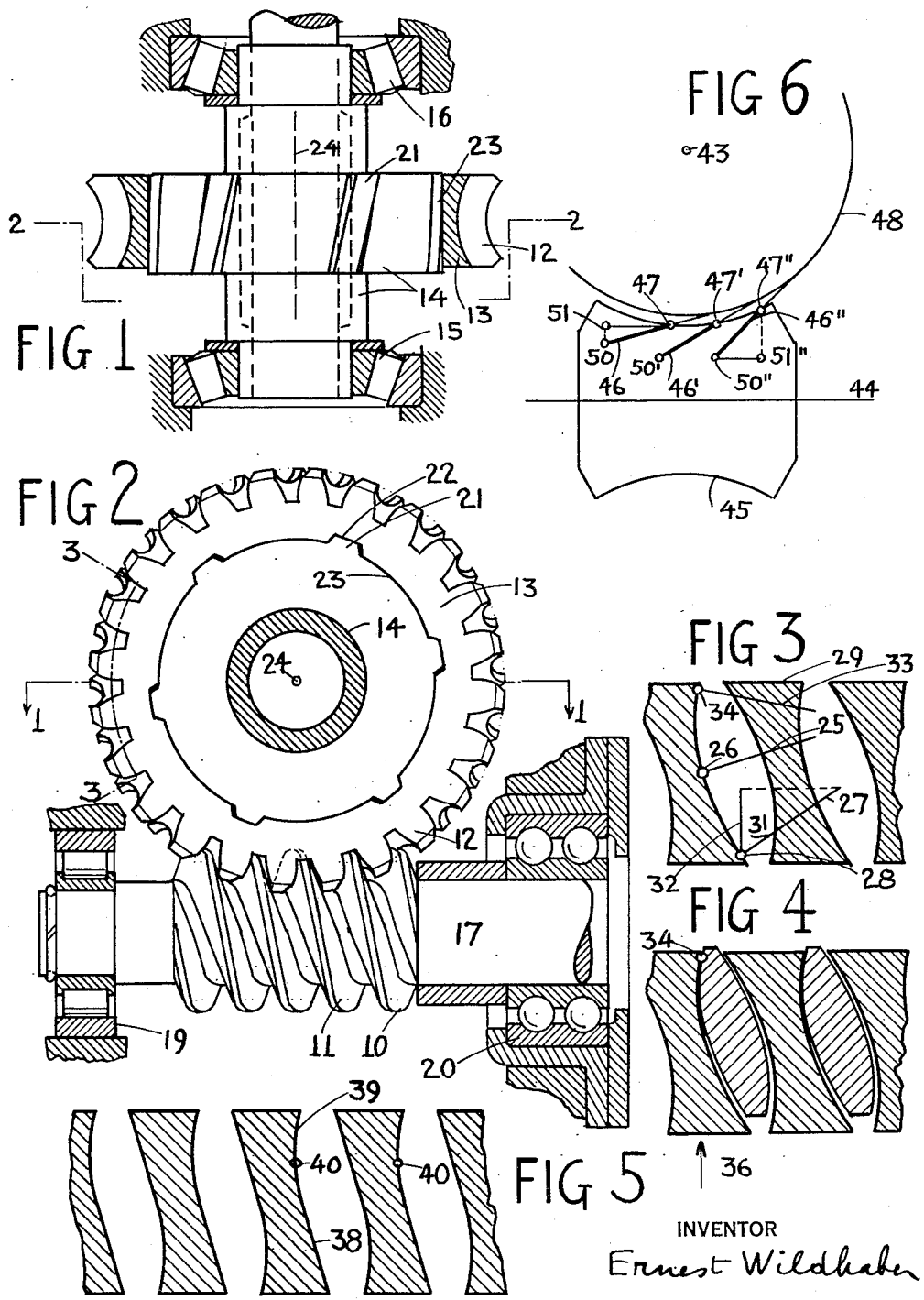
INVENTOR
Ernest Wildhaber Feb. 2, 1937.  E. WILDHABER  2,069,433
GEAR DRIVE
Original Filed Oct. 5, 1933  3 Sheets—Sheet 2
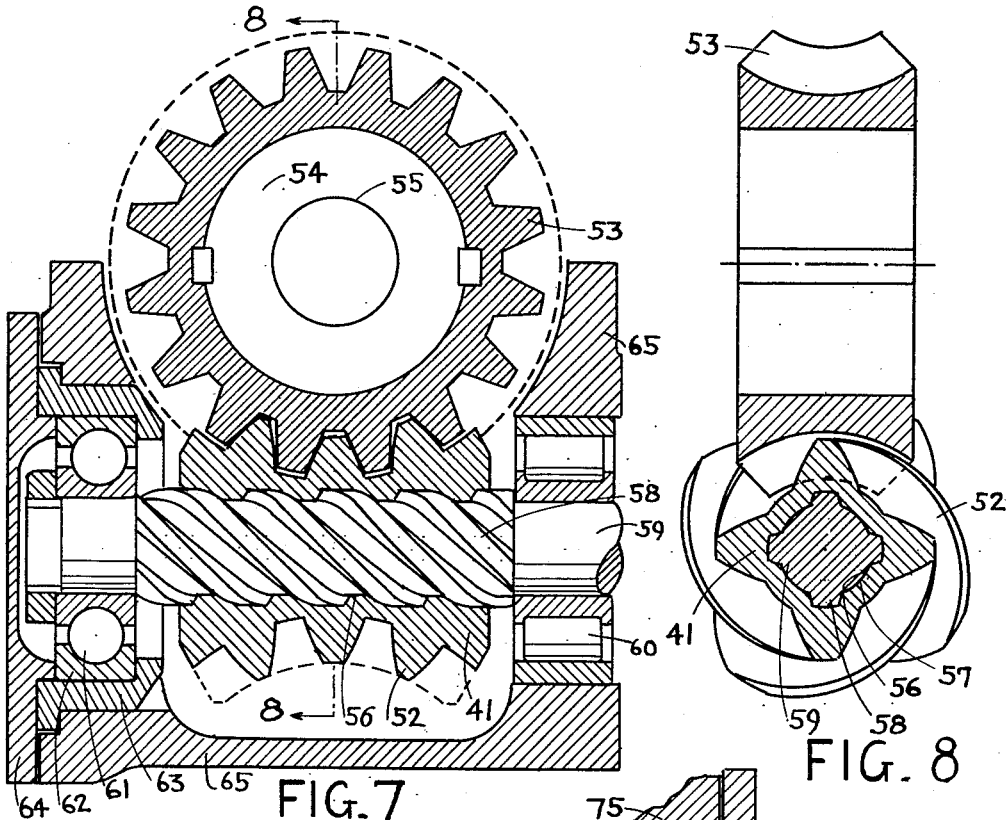
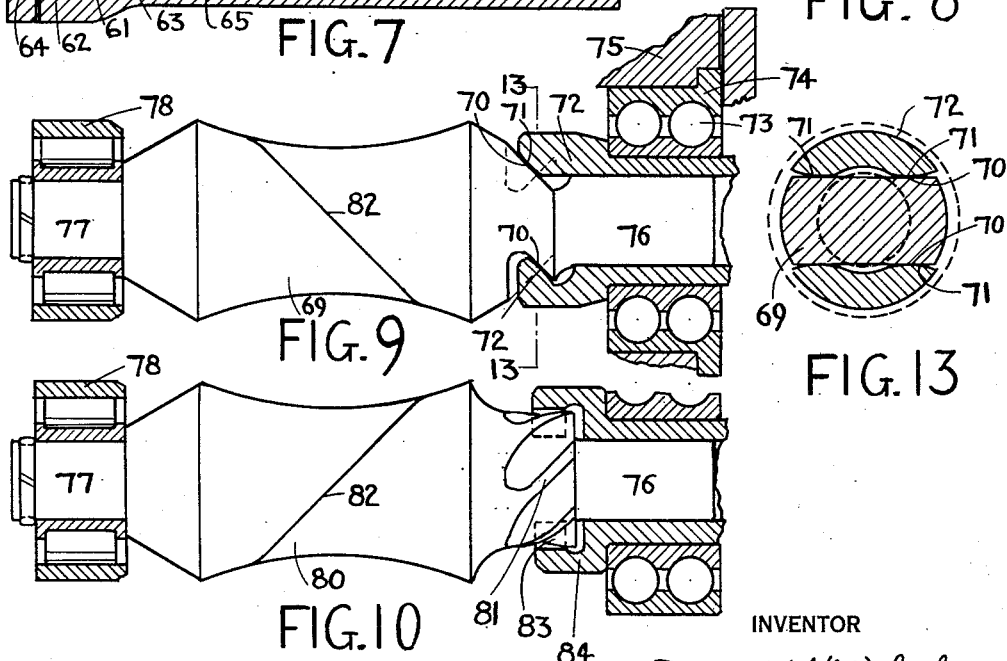
INVENTOR
Ernest Wildhaber INVENTOR
Ernest Wildhaber Patented Feb. 2, 1937

2,069,433

UNITED STATES PATENT OFFICE 2,069,433

GEAR DRIVE

Ernest Wildhaber, Irondequoit, N. Y.

Application October 5, 1933, Serial No. 692,310
Renewed July 9, 1936

19 Claims. (Cl. 74—402)

The present invention relates to gear drives, and particularly to the mounting of gears having non-helical teeth inclined to the direction of the gear axis. Such gears include worm wheels, hour glass worms and other worms having non-helical threads or teeth, cylindrical gears having teeth curved lengthwise in the development of the pitch surface to a plane, and bevel and hypoid gears.

One object of the present invention is to provide a gear set which is insensitive to inaccuracies of mounting, and which is insensitive to elastic deflections or yielding of the mounting under load. A related aim is to provide an excellent and smooth running gear set which does not have to be assembled with the care hitherto required for obtaining an equal or comparable performance.

Another object is to provide a gear set of high quality, which may be produced at comparatively low cost.

Hitherto gears were made less sensitive to inaccuracies of mounting and to deflections by easing off the top and the lower flank of the tooth profiles, and the end portions of the teeth. This procedure, which is widely used for instance on spiral bevel and hypoid gears, results in a reduction of the actual tooth bearing area, in a reduction of the number of simultaneously meshing teeth, and in a reduced wearing quality and reduced strength of the gears. In other words, this known procedure obtains the desired quality at a large sacrifice.

The present invention aims to obtain this quality without sacrifice, to provide gear drives running more smoothly and having large tooth bearing areas, so that they have improved wear and strength qualities. Another object is to provide a gear drive of the character referred to, which has an increased load capacity and a high efficiency.

These and other objects are attained in accordance with the present invention by providing a self adjustment of one member of the gear pair, namely a self adjustment along the axis of said member. This adjustment is such as to maintain the center of the tooth bearing area near the center of the tooth surface, as will be more fully described hereafter.

Embodiments of the present invention will be described with reference to the accompanying drawings, in which—

Fig. 1 and Fig. 2 are a plan view and a corresponding front elevation illustrative of one embodiment of the present invention. Fig. 1 is partly a section along lines 1—1 of Fig. 2, and Fig. 2 is partly a section along lines 2—2 of Fig. 1.

Fig. 3 is a partial development of the circumference of the worm wheel shown in Fig. 2, and a diagram further illustrative of the present invention. Fig. 3 can be considered as a section along lines 3—3 of Fig. 2, shown in a larger scale than Fig. 2.

Fig. 4 is a diagram similar to Fig. 3, further illustrative of the present invention.

Fig. 5 is a diagram applied to a modified form of worm wheel.

Fig. 6 is a diagram explanatory of another embodiment of the present invention.

Fig. 7 is a view of an embodiment of the present invention as applied to worm drives containing throated worms. The worm is shown in an axial section perpendicular to the worm wheel axis.

Fig. 8 is a section along lines 8—8 of Fig. 7, the worm wheel bearings being omitted in the drawings.

Fig. 9 to Fig. 12 are views of different modifications of the present invention, all pertaining to worm drives having throated worms. The said figures illustrate modified arrangements of the mounting and operative connection of a throated worm and a drive member coaxial with said worm.

Fig. 13 is a section along lines 13—13 of Fig. 9.

Figure 11:
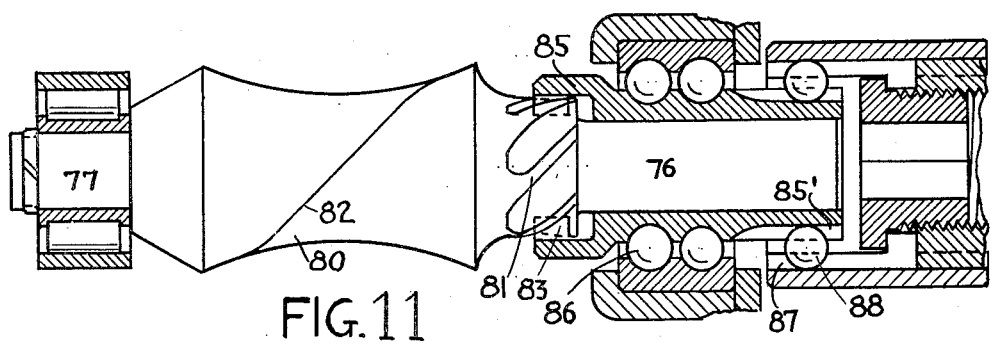

In Fig. 1 and Fig. 2 of the drawings numeral 10 denotes a cylindrical worm of conventional character, having helical threads or teeth 11 which engage the teeth 12 of a worm wheel 13. Said worm wheel is disposed on a shaft member 14 which is rotatably mounted in bearings 15, 16. In the illustrated instance worm 10 is formed integral with its shaft 17 and is rotatably mounted in bearings 19, 20.

The novel feature resides in the operative connection between worm wheel 13 and shaft member 14, which is maintained in an axially fixed position. The said member contains helical teeth or splines 21, which engage corresponding helical tooth spaces or grooves 22 provided in the bore 23 of worm wheel 13. A sliding fit is provided, so that the worm wheel may move along said teeth (21) in a helical path about its axis 24.

The novel purpose and operation of this arrangement will now be described with reference to Fig. 3, where the teeth 12 are shown in a peripheral section extending midway of the tooth height.

When the gears are exactly in the desired mounting position, the resultant or average tooth pressure extends substantially along the tooth normal 25 at a mean point of mesh 26.

On account of the non-helical nature of the worm wheel teeth, which are conjugate to the helical threads of the worm, the inclination of the tooth normals changes lengthwise of a tooth. So the inclination of normal 27 at point 28 is larger than the inclination of normal 25 with respect to the peripheral direction 29. And consequently a unit force (31) extending along said normal 27 has a larger component 32 in the direction of the worm wheel axis than a unit force has, which extends along mean normal 25. Normal 33 at point 34 illustrates the inclination at the opposite end of the teeth. The inclination of normal 33 is even opposite to the inclination of normals 25, 27 in the shown instance. In any case the inclination of the normals changes along the tooth, and the thrust component (32) of a unit force also changes along the tooth.

A mean axial thrust load, per unit of torque transmitted, is exerted when the tooth bearing area is centered around mean point 26. Then namely the resultant tooth pressure coincides substantially with normal 25. A larger axial thrust load is exerted when the tooth bearing area is centered around a point displaced from point 26 towards point 28; and a smaller axial thrust load is exerted when the tooth bearing area is centered around a point displaced from point 26 towards point 34.

In accordance with the present invention this variation of the axial thrust load, per unit of torque transmitted, is made use of for effecting a self adjustment of the gear along its axis. The lead of the helical splines is made to conform to the inclination of the normal (25) at a suitable mean point (26), so that equilibrium between the axial thrust load of the gear teeth and the axial thrust load exerted through the helical splines exists only when the resultant tooth pressure coincides substantially with said normal (25).

The worm wheel teeth 12 can be considered as having an axial lead changing lengthwise of the teeth. The axial lead at any point (26 or 28) is equal to the lead of a helix laid tangent to the tooth side at said point and concentric with the gear axis. The lead of the helical splines 21 (Fig. 1 and Fig. 2) is made equal to the lead at a mean point 26 (Fig. 3) of the worm wheel teeth.

The operation is illustrated by Fig. 4, which shows an exaggerated displaced position of the worm and wheel, so that the tooth bearing area is centered around point 34. In this position the axial thrust of the helical splines does not balance the axial thrust of the meshing wheel teeth. The worm wheel is therefore displaced along said helical splines in the direction of the larger axial thrust, namely in the direction of arrow 36, until equilibrium is restored, namely until the mean tooth pressure coincides again with mean normal 25.

The center of the tooth bearing area is therefore maintained at a given place (26), which is usually made to coincide with the middle of the teeth. And whenever the tooth bearing area tends to shift away from there, towards the ends of the teeth, the desired position of the tooth bearing area is automatically restored through the described self adjustment.

For this reason there is no danger that the tooth bearing area might shift to the tooth ends and edges of the teeth, and the tooth bearing area can therefore be kept large. While preferably the tooth ends are somewhat relieved from the theoretical shape of rigid bodies, the said relief may be kept so small that the tooth contact actually extends over the entire tooth surface. The relief then merely serves to reduce the tooth pressure at the tooth ends.

It is seen from the foregoing, that the desired operation is based on a form of tooth having a changing axial lead, so that different axial thrust components are received at different points lengthwise of a tooth, per unit of torque transmitted. Such teeth may be broadly characterized as non-helical teeth inclined to the axial planes of the gear, or as teeth of changing axial lead. Usually moreover the tooth sides of the axially movable member are curved lengthwise.

Figures 15, 16:
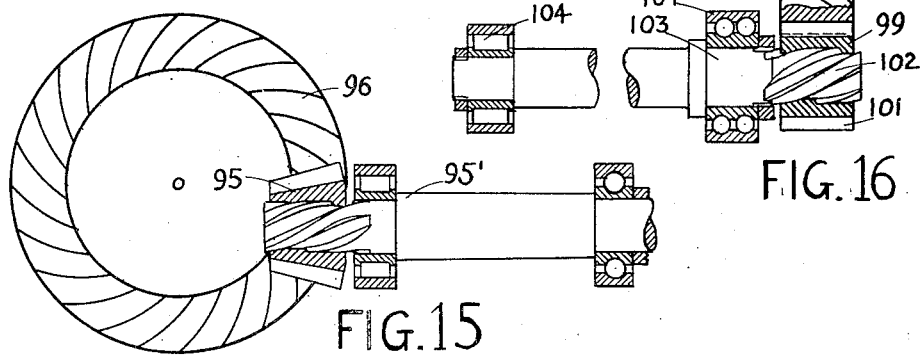
Fig. 15 is a diagrammatic view of an embodiment of the present invention applied to a hypoid gear drive.
Fig. 16 is diagrammatic view of an embodiment of the present invention as applied to gears mounted on parallel axes and having teeth curved lengthwise.
Figure 14:
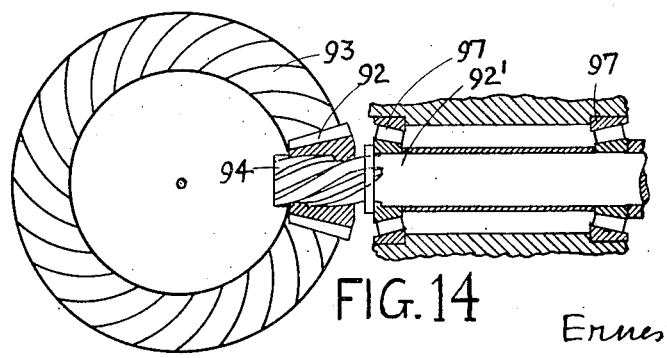
Fig. 14 is a diagrammatic view of a spiral bevel gear drive embodying the principles of the present invention.

From the foregoing it is obvious that the tooth surfaces of the self adjusting member should depart substantially from helical surfaces of constant axial lead, usually at least so much that assembly or disengagement along the axis of said member is prevented. An exception may be made with tapered gear pairs, (Fig. 14, Fig. 15).

In accordance with the present invention, a gear member of the above said general character is mounted axially movable, and is operatively connected with a coaxial torque transmitting element by thrust exerting means, preferably by helical splines or teeth.

I have furthermore discovered that a maximum benefit may be obtained, when the tooth surfaces of the gear are such that a unit force acting along any tooth normal exerts the same or substantially the same torque on the gear, as a unit force acting along any other tooth normal of the gear.

It can be demonstrated mathematically that in this case the tooth surfaces of different teeth of a gear are equidistant surfaces, or form parts of equidistant surfaces. These surfaces have a constant normal distance from each other, measured along the tooth normals or tooth perpendiculars. I have called such surfaces involoid surfaces, on account of their relationship with involute teeth.

In the case of a worm drive containing a helical worm (10) involoid tooth surfaces are obtained on the worm wheel, when the worm thread is an involute helicoid. The tooth normals or thread normals of the worm have then a constant inclination with respect to the worm axis and are tangent to a base cylinder. A unit force acting along any of these normals evidently exerts a constant moment on the worm, and in consequence a unit force acting along any tooth normal of the conjugate worm wheel exerts a constant moment on said worm wheel. The latter moment and the moment exerted on the worm are in the proportion of the respective numbers of teeth and threads.

More broadly, involoid surfaces are obtained on a gear when it is formed conjugate to an involute helicoid, or also to straight involute teeth, regardless of whether or not the involute helicoid or the involute gear is the mating gear of the gear considered.

In accordance with my discovery any (small) displacement whatsoever between a pair of gears, or any deflection of the mounting, can be exactly compensated through an axial displacement of a gear having non-helical involoid tooth surfaces. In other words through the described self adjustment the center of the tooth bearing is kept at a predetermined mean point, and is prevented from moving up or down on the tooth profiles or endwise of the teeth. An inaccuracy in the relative position of the turning centers, an inaccuracy of the center distance or of the shaft angles, everything is fully compensated, when the axially movable gear contains non-helical involoid teeth. This applies to other gearing as well as to worm gearing.

Generally it is sufficient for obtaining the full benefit of the present invention that involoid teeth are merely approximated. Moreover it should be clearly understood that the outlined involoid form of teeth represents only the preferred embodiment, and that any other form of non-helical teeth may be used with some advantage.

Fig. 5 illustrates an embodiment where the axially movable worm wheel contains composite tooth surfaces. These contain a helical portion 38, which appears as a straight line in the development illustrated, and a concave portion 39 of changing axial lead.

When a worm wheel of this character is mounted floating as described above, the lead of the helical guides should conform to the lead at a point 40 which is disposed on the concave portion 39 of the worm wheel teeth. In other words the lead of the helical guides is made equal to the lead of a helix concentric with the worm wheel axis and tangent to the tooth side at said point 40, whose tooth normal coincides with the desired resultant tooth pressure. This lead differs from the lead of helices tangent at other points along the tooth side, the change of lead being the main principle underlying the desired self adjustment.

In the embodiment illustrated in Fig. 7 and Fig. 8 the worm 41 is of hour glass form. In other words it is a throated worm, whose diameter increases from the center towards both sides. Its threads or teeth are non-helical surfaces, or surfaces having a changing axial lead. In the development of a cylindrical section concentric with the worm axis the thread 52 of worm 41 would show a concave longitudinal profile, in principle similar to the longitudinal profile shown in Fig. 3.

A tooth or thread of this character receives different axial thrust components per unit of torque transmitted at different points lengthwise of a tooth or thread.

In other words, an elemental tooth load applied along a tooth normal near one end of the worm thread has a larger axial thrust component than an elemental tooth load applied midway between the two ends of the worm thread, provided that said elemental tooth loads correspond to equal amounts of torque transmitted. An elemental tooth load applied along a tooth normal near the other end of the worm thread then has a smaller axial thrust component than the elemental tooth load applied midway between the two ends of the thread, or also than the elemental tooth load applied at said one end, provided again that all said elemental tooth loads correspond to the same amount of torque transmitted. In other words said elemental tooth loads are of such magnitude that they all exert the same torque with respect to the worm axis.

The change of the axial thrust components along the worm thread will now be further explained with reference to diagram Fig. 6, where numerals 43 and 44 denote the axes of the worm wheel and of the worm respectively. The worm is indicated by its throated contour 45. Tooth normal 46 at a mean point 47 of the worm wheel is inclined to the drawing plane and appears tangent to a circle 48 concentric with the worm wheel.

A given elemental force applied along tooth normal 46, and plotted in Fig. 6 as a distance 47—50, has a thrust component 47—51 in the direction of the worm axis 44. For explanation purposes point 47 of the worm wheel is now turned about the worm wheel axis into positions 47' and 47''. The same elemental force applied along tooth normals 46', 46'' at points 47' and 47'' respectively is plotted as a distance 47'—50' and an equal distance 47''—50'', which distances are also equal to distance 47—50. It is evident from the drawings that the components along the worm axis of said force changes, and that component 50''—51'' of the last mentioned position is smaller than component 47—51. Accordingly, when the resultant tooth load between the worm and worm wheel acts substantially along normal 46, a comparatively large axial thrust load (47—51) is exerted on the worm. When on the other hand the resultant tooth load acts substantially along tooth normal 46'' near the end of the worm thread, then the axial thrust load (50''—51'') is comparatively small.

This change of the axial thrust load at different points lengthwise of a tooth or thread is made use of in the present invention to effect a self adjustment of the worm, whereby the mesh is maintained at a predetermined place, and is prevented from shifting off the thread surfaces to the very ends and edges of the threads.

Throated worm 41 contains non-helical threads 52, which are conjugate to the teeth of worm wheel 53. Said worm wheel is rotatably mounted in an axially fixed position, as in common practice. Its rim is rigidly secured to a shaft member 54 (Fig. 7) which is held in bearings diagrammatically indicated by circle 55.

On the inside of its bore 56, worm 41 contains internal threads or teeth 57, which contact with external helical threads or teeth 58 of an element 59 which is concentric with worm 41. In accordance with the established use of the term, helical threads or helical surfaces are here understood to be portions of threads or surfaces of constant axial lead or pitch. Concentric cylindrical sections of helical surfaces have straight longitudinal profiles in the development of said sections to a plane, as well known.

While the worm threads 52 have a changing axial lead and are sensitive to axial displacements, the threads 57 and 58 have a constant axial lead and are helical, so that worm 41 is movable in a helical path with respect to element 59. The latter is rotatably mounted in an axially fixed position, by means of bearings 60, 61. The outer race 62 of bearing 61 is held axially in both directions in known manner, namely by means of a bushing 63 and a cover 64, which is secured with screws to the stationary casing 65. For simplification said screws are omitted in the drawings, and the lower portion of casing 65 is shown only.

Power is transmitted through element 59.

The lead of the threads 57 and 58 conforms to a predetermined mean lead of the non-helical worm threads 52. Any mean point of the thread surface may be chosen as the desired center of the tooth bearing area. The lead angle (s) at said point is then determined in a cylindrical section concentric with the worm axis, with the known methods of descriptive geometry. The lead L at said point is then readily computed from the lead angle (s) and the radius (R) of said point. As well known $$L = 2\Pi R \cdot \tan s; \Pi = 3.1416$$

Helical threads 57, 58 are made with this lead L and with a hand equal to the hand of the worm threads 52.

In operation the axial position of worm 41 is controlled through its engagement with the worm wheel 53. When the tooth bearing area tends to shift to one end of the threads, the different axial thrust component exerted on the worm threads is out of balance with the axial thrust exerted on the internal helical threads 57 by element 59, and the worm starts to move axially until equilibrium is restored, that is to say until the center of the tooth bearing area again coincides substantially with the assumed point, for which the lead L of the helical threads 57, 58 has been determined.

In principle the operation is therefore the same as explained with reference to Fig. 4.

In the modification illustrated in Fig. 9 and Fig. 13 the throated worm 69 contains guide portions 70 disposed adjacent one end of the worm. Portions 70 have inclined plane sides, which contact with convex portions 71 of an element 72 concentric with worm 69. This structure serves as another example of means for obtaining a substantially helical displacement between the worm 69 and concentric element 72. Inasmuch as only a very short substantially helical displacement is needed this structure and many other structures could fulfill the requirement.

Element 72 is rotatably mounted in an axially fixed position by means of a bearing 73, whose outer race 74 is rigidly connected with a stationary portion 75.

Shaft projections 76, 77 are formed integral with worm 69. Projection 76 bears against the tubular element 72; and projection 77 is mounted in a bearing 78. Again the throated worm is movable in a substantially helical path with respect to element 72 which is axially fixed, the axial position of the worm with respect to element 72 being controlled by the mesh between the worm and its worm wheel.

In the modification illustrated in Fig. 10, throated worm 80 contains helical teeth or threads 81 disposed near one end of the worm proper. The non-helical worm threads are indicated here, as well as in Figs. 9, 11, 12 by a line 82. The lead of the teeth 81 corresponds to a mean axial lead of the non-helical threads 82, with which the worm meshes with its worm wheel. Helical teeth 81 engage internal teeth 83 of an element 84, which is coaxial with worm 80, and which is rotatably mounted in an axially fixed position. Shaft projection 76 of worm 80 bears against said element 84. The other shaft projection, 77, of worm 80 is rotatably held in a bearing 78.

Preferably the number of the helical teeth 81 is equal to the number of the non-helical threads 82, and said threads and teeth are alined with each other.

This is also preferably observed in other embodiments. So in Fig. 8 the helical projections 58 are alined with the non-helical threads 52 for reasons of strength.

If so desired the number of helical projections and spaces may be made a simple fraction of the number of non-helical teeth of the worm or other gear, such as one half or one third of said number. Even a single helical projection and mating helical space could be used.

The embodiment illustrated in Fig. 11 differs from the embodiment of Fig. 10 especially through the shape of the axially fixed element 85, which is concentric with throated worm 80 and formed integral with the inner race of a bearing 86. The outer race of said bearing is fixed axially as well as radially. The end 85' of element 85 forms part of a universal or nearly universal coupling, which consists of portion 85', an internal portion 87, and of balls 88 operatively connecting said portions. Portions 85' and 87 contain substantially straight axial grooves similar to tooth spaces, on which the balls 88 may roll. The grooves may be V-shaped if so desired.

Worm 80 contains threads (82) which follow its concave contour and which have a changing axial lead. Worm 80 also contains shaft projections 76, 77 and helical teeth 81, which engage internal teeth 83 provided on said element 85.

Figure 12:
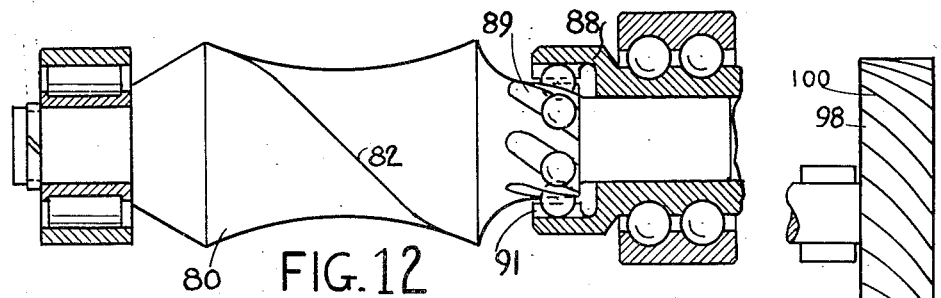

The embodiment illustrated in Fig. 12 differs from the embodiments of Fig. 10 and of Fig. 11 through the detail of the operative connection between throated worm 80 and axially fixed member 88. Helical grooves 89, or broadly grooves inclined to the direction of the worm axis, are provided on worm 80. Similar grooves 91 are internally arranged on element 88, which is rotatably mounted in an axially fixed position. The grooves 89, 91 have the same lead (L), which may be determined in the manner described from the given non-helical worm thread (82), and which is equal to the mean axial lead of said worm thread.

With this arrangement the friction opposing the desired self adjustment may be practically eliminated.

The invention is applicable alike to drives with single threaded worms.

An application of the present invention to spiral bevel gear drives, and an application to hypoid gear drives will now be described with reference to Fig. 14 and Fig. 15.

Pinion 92 (Fig. 14) meshes with a gear 93, which is rotatably mounted in conventional manner. Pinion 92 is operatively connected with a concentric element or shaft member 92' by means of helical guides 94, whose lead is equal to a mean axial lead of the pinion teeth. Said shaft member 92' is rotatably mounted in bearings 97 and is axially fixed.

In operation pinion 92 may adjust itself with respect to said axially fixed shaft member, to maintain the tooth bearing area automatically in the predetermined desired position.

Pinion 95 (Fig. 15) meshes with a gear 96 mounted in conventional manner, and is mounted like pinion 92 of Fig. 14. It is movable in a helical path with respect to a concentric shaft member 95', which is mounted in an axially fixed position and through which power is transmitted. Here however the axis of the pinion (95) is offset from the axis of the gear (96).

In both cases the teeth provided are curved lengthwise and inclined to the generatrices of their pitch surfaces. Here also substantially involoid tooth surfaces are preferably provided, that is to say tooth surfaces having a constant pitch along the tooth normals. Moreover it is desirable to provide teeth which extend lengthwise substantially along involutes on the gears (93, 96) or on the basic gears, namely for instance on the crown gears from which the gear pair 92, 93 may be derived in known manner.

In Fig. 16 numeral 98 denotes a substantially cylindrical gear meshing with a pinion 99. Gear 98 and pinion 99 contain teeth 100, 101 curved lengthwise and are rotatable on parallel axes. The gear (98) may be mounted in conventional manner, while the pinion is movable in a helical path, along helical guides 102, with respect to a concentric shaft member 103. This member is rotatably mounted in bearings 104 which maintain it axially fixed.

The lead of the helical guides is determined in accordance with the principles disclosed, and is equal to a mean axial lead of the pinion teeth, preferably to the lead at the middle of the pinion face.

Here also involoid tooth surfaces may be provided with advantage. It is found that in the case of substantially cylindrical gears the pressure angle of involoid teeth increases with decreasing inclination of the tooth direction with respect to the direction of the axis of rotation.

Many modifications may be made in my invention without departing from its spirit, by simply applying the established practice and knowledge to the principles here disclosed.

What I claim is:

1. A gear drive, comprising a pair of intermeshing gears having teeth inclined to the direction of their respective axes, at least one of said gears having teeth of changing axial lead so as to receive different axial thrust components per unit of torque transmitted at different points lengthwise of a tooth, a rotary element coaxial with said one gear, means for rotatably mounting said element in an axially fixed position, an operative connection between said element and said one gear to permit motion of said one gear in a substantially helical path with respect to said axially fixed element while in operation, the lead of said path being equal to the axial lead of the teeth of said one gear at a point intermediate the tooth ends and differing from the axial leads at said tooth ends, so that the axial thrust load of the gear teeth is balanced only when the resultant tooth pressure coincides substantially with the tooth normal at said intermediate point, and means for rotatably mounting the other gear of said pair in engagement with said one gear.

2. A gear drive, comprising a pair of intermeshing gears having teeth inclined to the direction of their respective axes, at least one of said gears having tooth sides curved lengthwise in development and having a changing axial lead, so as to receive different axial thrust component per unit or torque transmitted at different points lengthwise of a tooth, a rotary element coaxial with said one gear, means for rotatably mounting said element in an axially fixed position, helically arranged portions provided on said one gear and on said element for engagement with each other to permit motion of said one gear in a substantially helical path with respect to said element while in operation, the lead of said path being equal to the axial lead of the teeth of said one gear at a point intermediate the tooth ends and differing from the axial leads at said tooth ends, and means for rotatably mounting the other gear of said pair in engagement with said one gear.

3. A gear drive comprising a pair of gears both having a plurality of teeth inclined to the direction of their respective axes, at least one of said gears having tooth surfaces of changing axial lead, shaft projections provided on said one gear, a rotary element concentric with said one gear and containing a bore for supporting one of said shaft projections, a bearing for rotatably mounting said element in an axially fixed position, another bearing for supporting the other of said shaft projections while permitting axial motion of said one gear, helically arranged portions provided on said element and on said one gear for engagement with each other, to permit motion of said one gear in a substantially helical path with respect to said element while in operation, and means for mounting the other gear of said pair in mesh with said one gear on an axis angularly disposed to and offset from the axis of said one gear.

4. A gear drive comprising a pair of gears having teeth inclined to the direction of their respective axes, at least one of said gears having tooth surfaces of changing axial lead, shaft projections provided on said one gear, a rotary element concentric with said one gear and containing a bore for supporting one of said shaft projections, a bearing for rotatably mounting said element in an axially fixed position, another bearing for supporting the other of said shaft projections while permitting axial motion of said one gear, externally arranged helical portions provided on said one gear, internally arranged portions provided on said element for engagement with said external portions, to permit motion of said one gear in a substantially helical path with respect to said element while in operation, and means for mounting the other gear of said pair in mesh with said one gear on an axis angularly disposed to and offset from the axis of said one gear.

5. A gear drive, comprising a pair of gears rotatable on parallel axes in engagement with each other and having teeth inclined to the direction of said axes, said teeth being curved lengthwise and having an axial lead changing to an extent which prevents disengagement by axial displacement, a rotary element concentric with one of said gears, means for rotatably mounting said element in an axially fixed position, an operative connection between said element and said one gear to permit motion of said one gear in a substantially helical path with respect to said element for self adjustment of said gear, and means for mounting the other gear of said pair in mesh with said one gear.

6. A gear drive, comprising a pinion and a gear rotatable on parallel axes in engagement with each other and having teeth inclined to the direction of said axes, said teeth being curved lengthwise and having an axial lead changing to an extent which prevents disengagement by axial displacement, a rotary element concentric with said pinion, means for rotatably mounting said element in an axially fixed position, an operative connection between said element and said pinion to permit motion of said pinion in a substantially helical path with respect to said element for self adjustment of said pinion, and means for mounting said gear in mesh with said pinion.

7. A gear drive, comprising a pair of gears rotatable on parallel axes and having teeth curved lengthwise and inclined to the direction of said axes, said teeth having a constant pitch along the tooth surface normals and an axial lead changing to an extent which prevents disengagement by axial displacement, a rotary element concentric with one of said gears, means for rotatably mounting said element in an axially fixed position, an operative connection between said element and said one gear to permit motion of said one gear in a substantially helical path with respect to said element for self adjustment of said gear, and means for mounting the other gear of said pair in mesh with said one gear.

8. A worm drive comprising a worm and a worm wheel conjugate to each other, the tooth sides of said worm wheel being longitudinally concave to an extent preventing disengagement by an axial displacement of the worm wheel, a rotary element concentric with said worm wheel, means for rotatably mounting said element in an axially fixed position, an operative connection between said element and said worm wheel to permit relative motion substantially in a helical path of constant lead, the lead of which is equal to the lead of the wheel teeth at a point intermediate their ends so that the axial thrust load of the worm wheel teeth is balanced only when the tooth pressure resultant passes through a predetermined portion of the teeth intermediate the tooth ends, and means for rotatably mounting said worm in engagement with said worm wheel.

9. A worm drive comprising a pair of intermeshing worm gears, the tooth sides of one of said worm gears being concave in the development of a cylindrical section concentric with its axis to an extent preventing disengagement by an axial displacement of said one worm gear, a shaft coaxial with said one worm gear and passing through a bore provided in said one worm gear, means for rotatably mounting said shaft in an axially fixed position, an operative connection between said shaft and said one worm gear to permit relative motion substantially in a helical path of constant lead, the lead of which is equal to the axial lead of the gear teeth at a point intermediate their ends so that the axial thrust load of the teeth of said one worm gear is balanced only when the tooth pressure resultant passes through a predetermined portion of the teeth intermediate the tooth ends, said lead being larger than the inside diameter of said bore, and means for rotatably mounting the other worm gear in mesh with said one worm gear.

10. A worm drive comprising a worm having helical thread surfaces of constant axial lead and a worm wheel conjugate thereto, the tooth sides of said worm wheel being longitudinally concave to an extent preventing disengagement by an axial displacement of said worm wheel, a rotary element concentric with said worm wheel, means for rotatably mounting said element in an axially fixed position, an operative connection between said element and said worm wheel to permit relative motion substantially in a helical path of constant lead, the lead of which is equal to the lead of the wheel teeth at a point intermediate their ends so that the axial thrust load of the worm wheel teeth is balanced only when the tooth pressure resultant passes through a predetermined portion of the teeth intermediate the tooth ends, and means for rotatably mounting said worm in engagement with said worm wheel.

11. A worm drive comprising a worm having involute helical thread surfaces and a worm wheel conjugate thereto, the tooth sides of said worm wheel being longitudinally concave to an extent preventing disengagement by an axial displacement of the worm wheel, a rotary element concentric with said worm wheel, means for rotatably mounting said element in an axially fixed position, helically arranged portions of constant axial lead provided on said element, recesses provided on said worm wheel for engaging said portions, the direction of said portions and recesses corresponding to the mean direction of the worm wheel teeth so that the axial thrust load of the worm wheel teeth is balanced only when the tooth pressure resultant is exerted substantially midway between the tooth ends, and means for rotatably mounting said worm in mesh with said worm wheel.

12. A worm drive comprising a worm and a worm wheel conjugate to each other, the thread sides of said worm being concave in the development of a cylindrical section concentric with said worm to an extent preventing disengagement by an axial displacement of said worm, a rotary element coaxial with said worm, means for rotatably mounting said element in an axially fixed position, an operative connection between said element and said worm to permit relative motion substantially in a helical path of constant lead, the lead of which is equal to the axial lead of the worm thread at a point intermediate the thread ends so that the axial thrust load of the worm thread is balanced only when the tooth pressure resultant passes through a predetermined portion of the thread intermediate the thread ends, and means for rotatably mounting said worm wheel in mesh with said worm.

13. A worm drive comprising a throated worm having multiple threads of varying axial lead and a worm wheel conjugate thereto, a rotary element coaxial with said worm, means for rotatably mounting said element in an axially fixed position, an operative connection between said element and said worm to permit motion of said worm substantially in a helical path of constant lead with respect to said element, said constant lead being equal to the axial lead of the worm threads at a point intermediate their ends so that the axial thrust load of the worm threads is balanced only when the tooth pressure resultant passes through a predetermined portion of the threads intermediate their ends, and means for mounting said worm wheel in mesh with said worm.

14. A worm drive comprising a throated worm having multiple non-helical threads with substantially equal diameters at both ends and a worm wheel conjugate thereto, a rotary element coaxial with said worm, means for rotatably mounting said element in an axially fixed position, a helical portion of substantially constant lead provided on said throated worm in addition to its non-helical threads of a helical portion provided on said element for slidable engagement with said helical portion of the worm so that the axial thrust load of the non-helical worm threads is balanced only when the tooth pressure resultant is exerted substantially midway between the ends of the threads, and means for mounting said worm wheel in mesh with said throated worm.

15. A worm drive comprising a throated worm having multiple non-helical threads with substantially equal diameters at both ends and a worm wheel conjugate thereto, a rotary element coaxial with said worm, means for rotatably mounting said element in an axially fixed position, a plurality of helical portions provided on said throated worm on one side of its concave contour, counterpart helical portions provided on said element for engagement with said helical portions of the worm, to permit relative motion in a helical path so that the axial thrust load of the non-helical worm threads is balanced only when the tooth pressure resultant passes through a predetermined portion of the threads intermediate their ends, and means for mounting said worm wheel in mesh with said throated worm.

16. A gear drive comprising a pair of intermeshing gears having each a plurality of teeth inclined to the direction of their respective axes and having tooth surfaces of substantially constant pitch along the tooth normals, the tooth surfaces of one of said gears having an axial lead varying from end to end of the teeth to an extent which prevents disengagement by an axial displacement of said one gear, a rotary element concentric with said one gear, means for rotatably mounting said element in an axially fixed position, an operative connection between said element and said one gear to permit relative motion substantially in a helical path of constant lead so that the axial thrust load of the teeth of said one gear is balanced only when the tooth pressure resultant passes through a predetermined portion of the last named teeth intermediate the tooth ends, and means for mounting the other gear of said pair in mesh with said one gear.

17. A gear drive comprising a pair of intermeshing gears having teeth inclined to their respective axes, one of said gears being formed conjugate to a helicoid of constant axial lead and having tooth surfaces whose axial lead changes to an extent which prevents disengagement by an axial displacement of said one gear, a rotary element concentric with said one gear, means for rotatably mounting said element in an axially fixed position, an operative connection between said one gear and said element to permit relative motion substantially in a helical path of constant lead so that the axial thrust load of the teeth of said one gear is balanced only when the tooth pressure resultant passes through a predetermined portion of the teeth intermediate the tooth ends, and means for mounting the other gear of said pair in mesh with said one gear.

18. A gear drive comprising a pair of intermeshing gears having angularly disposed axes, one of said gears having tooth sides whose axial lead changes from end to end of the teeth, a rotary element concentric with said one gear, means for rotatably mounting said element in an axially fixed position, an operative connection between said one gear and said element to permit relative motion substantially in a helical path of constant axial lead, the lead of which is equal to the axial lead of said one gear at a point intermediate the tooth ends so that the axial thrust load of the teeth of said one gear is balanced only when the tooth pressure resultant passes through a predetermined portion of the teeth intermediate the tooth ends, and means for mounting the other gear of said pair in mesh with said one gear on an axis angularly disposed to the axis of said one gear.

19. A gear drive comprising a pair of meshing gears, one of which has teeth whose axial lead changes from end to end, and a shaft formed with helical splines, the lead of which is constant and equal to the axial lead of the tooth sides of said one gear at a predetermined point along their length, said gear being formed with recesses in its bore to engage said splines and being mounted on said shaft for helical movement thereon as the gear and its mate rotate together.

ERNEST WILDHABER.